Sept. 1, 1925.  
E. H. SHERBONDY  
BRAKE  
Filed April 11, 1921

Inventor  
Earl H. Sherbondy

By Whittemore Hulbert Whittemore  
 & Belknap  
Attorneys

Patented Sept. 1, 1925.

1,551,587

UNITED STATES PATENT OFFICE.

EARL H. SHERBONDY, OF DETROIT, MICHIGAN, ASSIGNOR TO SIDNEY D. WALDON, OF DETROIT, MICHIGAN.

BRAKE.

Application filed April 11, 1921. Serial No. 460,422.

*To all whom it may concern:*

Be it known that I, EARL H. SHERBONDY, a citizen of the United States of America, residing at Detroit, in the county of Wayne and State of Michigan, have invented certain new and useful Improvements in Brakes, of which the following is a specification, reference being had therein to the accompanying drawings.

The invention relates to brakes of the internal drum type and consists in various features of construction as hereinafter set forth.

A is the brake drum secured to a vehicle wheel or other rotating member. B is the stationary brake head forming a closure for the drum and which, as shown, is mounted upon the axle housing C. D is a fitting secured to the head B, preferably by riveting, and forming a bearing for a pair of pins E, which constitute the fulcrums for the brake levers F.

It is the usual practice with internal brakes to form the brake levers in fixed relation to the shoes which engage the braking face of the drum. This has the effect of applying the pressure unequally to different portions of the surface and also of rendering difficult the adjustment of the brakes for wear. With my improved construction the levers apply their power centrally of the brake shoes with freedom for pivoting, so that said shoes are self-adjustable and will uniformly distribute the pressure.

As specifically shown, the levers F are bent so as to provide clearance for the axle bearing within the drum and at the apex of the bend each lever is pivotally connected to a brake shoe G. This pivotal connection is formed by the pin I passing through aligned apertures in the lever and in ears J projecting radially inward from the center of the shoe. K is an adjustable stop member, preferably a screw engaging a threaded socket at one end of the shoe and having its free end adapted to contact with a bearing on the lever. L is a spring connecting the shoe and the lever and holding the stop normally against the lever. One end of each lever is fulcrumed upon the pin E, while the opposite end is connected by a link M to a rock arm N centrally arranged between the two levers. The links M are preferably formed with segmental cylindrical end portions O, which are end-wise engageable with segmental cylindrical sockets P in the ends of the levers, the arrangement being such as to prevent disengagement of the links excepting by an endwise movement, while permitting a pivotal action within the required angle. Q are springs cross connecting the levers F adjacent to the rock arm N.

Figure 1:
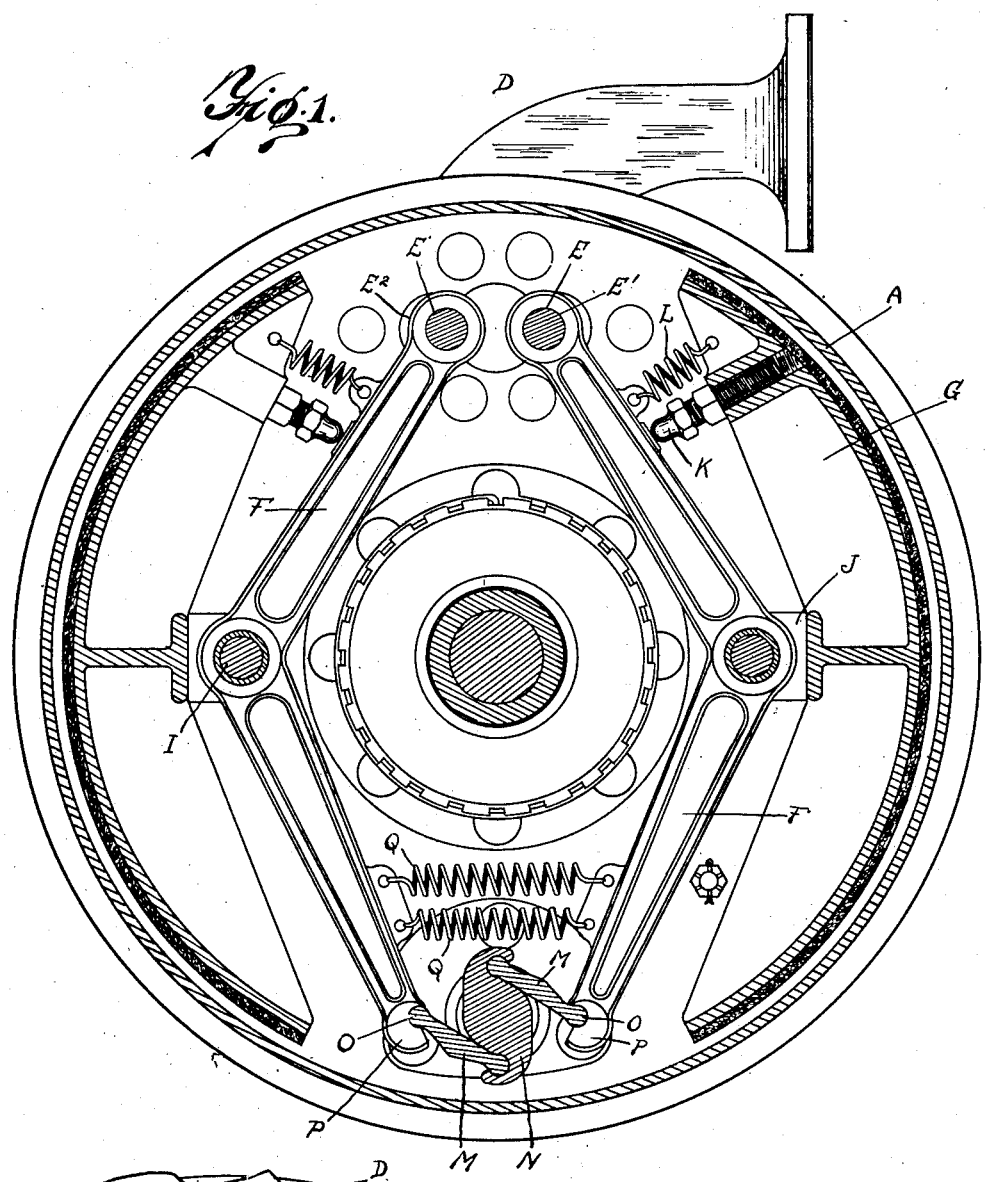
Figure 1 is a section through the brake drum in the plane of rotation.
Figure 3:
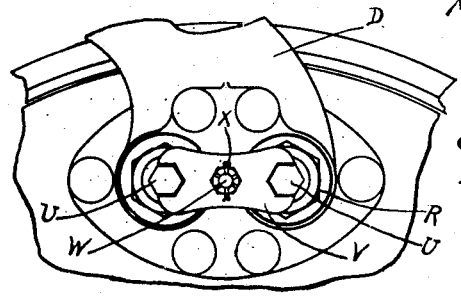
Fig. 3 is a detailed rear elevation of the plate applied to the polygonal heads of the pins journaled in the fitting secured to the head of the brake drum.
Figure 2:
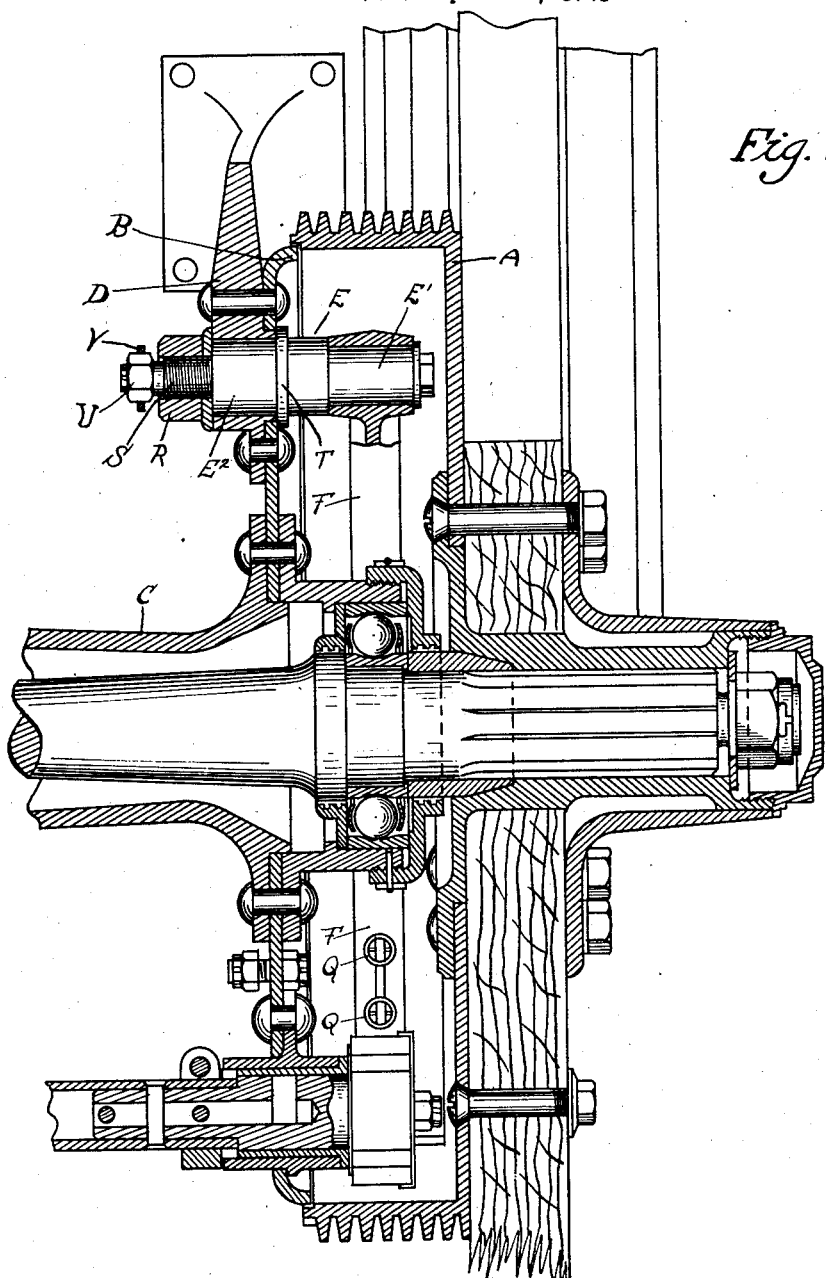
Figure 2 is a transverse section.

With the construction as thus far described when the parts are in the position shown in Figure 1, the shoes G are retracted from contact with the internal surface of the drum and the rock arm N is arranged at right angles to a line connecting the two levers. When, however, the rock arm is partially rotated, the links M will be pressed outward or away from each other, which will cause the movement of the shoes G into contact with the braking surface and pressure thereagainst sufficient to produce the braking effect. The pressure will be uniformly distributed over the entire surface of the shoe and thus there is produced a maximum of friction with a minimum of wear. When the rock arm N is rotated in the reverse direction, the levers and the shoes will be retracted, assisted by the springs Q, while the springs L will press the stop K against the lever and hold the shoes in a neutral position.

To provide an adjustment for taking up wear, the pins E are preferably formed with the portions E' thereof, which engage the levers eccentric to the portions E² which engage the bearings D. By reason of this eccentricity, when the pins E are rotated, the journal portions E' will be moved either closer or further apart and by this means suitable adjustment can be readily made to compensate for wear. The pins are locked in different positions of adjustment by clamping nuts R which engage threaded studs S at the ends of the pins and which draw a shoulder T against the bearing. To facilitate turning of the pins they are provided with polygonal heads U and an index for adjustment is formed by a plate V having polygonal recesses for engaging said polygonal heads U. The plate V may be secured by a screw W and locking cotter pin X, this permitting of at any time removing the plate and adjusting the pins E as required.

What I claim as my invention is:

1. A brake comprising a head and a drum relatively revoluble, segmental brake shoes within said drum, levers for actuating said shoes, fulcrum pins for said levers having eccentric portions for engaging said head, means for rotating said eccentric pins to adjust the fulcrums for said levers, and an index for said adjustment comprising polygonal heads on said pins, and an intermediate member having polygonal sockets for engaging said heads.

2. A brake comprising a head and a drum relatively revoluble segmental brake shoes within said drum, levers for actuating said shoes, fulcrumed pins for said levers having eccentric portions for engaging said head, means for rotating said eccentric pins to adjust the fulcrums for said lever; said pins having polygonal heads, a plate having polygonal sockets for engaging said heads and removable means for retaining said plate in position.

In testimony whereof I affix my signature.

EARL H. SHERBONDY.